(12) United States Patent
Nochimowski et al.

(10) Patent No.: US 8,452,927 B2
(45) Date of Patent: May 28, 2013

(54) DISTRIBUTED STORAGE SERVICE SYSTEMS AND ARCHITECTURE

(75) Inventors: Alain Nochimowski, Tel Aviv (IL); Itzhak Pomerantz, Kefar Sava (IL); Micha Rave, Herzliya (IL)

(73) Assignee: SanDisk Technologies Inc., Plano, TX (US)

( * ) Notice: Subject to any disclaimer, the term of this patent is extended or adjusted under 35 U.S.C. 154(b) by 989 days.

(21) Appl. No.: 12/019,573

(22) Filed: Jan. 24, 2008

(65) Prior Publication Data

US 2009/0172217 A1  Jul. 2, 2009

Related U.S. Application Data

(60) Provisional application No. 61/018,644, filed on Jan. 2, 2008, provisional application No. 61/018,979, filed on Jan. 4, 2008.

(51) Int. Cl.
*G06F 13/00* (2006.01)

(52) U.S. Cl.
USPC .......................................... 711/154; 709/216

(58) Field of Classification Search
USPC .......................................... 711/154; 709/216
See application file for complete search history.

(56) References Cited

U.S. PATENT DOCUMENTS

| | | | |
|---|---|---|---|
| 5,509,134 A | 4/1996 | Fandrich et al. | |
| 6,745,286 B2 | 6/2004 | Staub et al. | |
| 6,748,467 B2 | 6/2004 | Yamamoto | |
| 6,986,030 B2 | 1/2006 | Shmueli et al. | |
| 7,085,879 B2* | 8/2006 | Aasheim et al. | 711/103 |
| 7,143,420 B2 | 11/2006 | Radhakrishnan | |
| 7,406,489 B2 | 7/2008 | Soini et al. | |
| 7,747,837 B2 | 6/2010 | Gorobets et al. | |
| 2004/0088417 A1 | 5/2004 | Bober et al. | |
| 2004/0243793 A1 | 12/2004 | Tang | |
| 2005/0160053 A1 | 7/2005 | Okamoto et al. | |
| 2005/0193161 A1 | 9/2005 | Lee et al. | |
| 2005/0203872 A1 | 9/2005 | Kwong Kwan | |
| 2005/0268339 A1 | 12/2005 | Bobrow | |
| 2006/0079284 A1 | 4/2006 | Lu et al. | |
| 2006/0107062 A1 | 5/2006 | Fauthoux | |
| 2006/0107330 A1 | 5/2006 | Ben-Yaacov et al. | |
| 2006/0288166 A1 | 12/2006 | Smith, Jr. et al. | |

(Continued)

FOREIGN PATENT DOCUMENTS

| | | |
|---|---|---|
| GB | 2 400 707 | 10/2004 |
| JP | H11-296418 A | 10/1999 |

(Continued)

OTHER PUBLICATIONS

Hennessy et al., Computer Organization and Design, Morgan Kaufmann Publishers, Inc., second edition, pp. 675-678.*

(Continued)

*Primary Examiner* — Jared Rutz
(74) *Attorney, Agent, or Firm* — Brinks Hofer Gilson & Lione

(57) ABSTRACT

Various methods, devices and systems are described for providing distributed storage services. A data storage device is capable of initiating a communication session with an external entity such as a local host computer (and vice versa) coupled directly to the data storage device, a remote server computer, or directly with remote data storage devices with or without intervention by a local host computer.

15 Claims, 11 Drawing Sheets

U.S. PATENT DOCUMENTS

| | | |
|---|---|---|
| 2007/0033373 A1 | 2/2007 | Sinclair |
| 2007/0038567 A1 | 2/2007 | Allaire et al. |
| 2007/0050538 A1 | 3/2007 | Northcutt et al. |
| 2007/0056042 A1 | 3/2007 | Qawami et al. |
| 2007/0156998 A1 | 7/2007 | Gorobets |
| 2007/0186279 A1 | 8/2007 | Zimmer et al. |
| 2007/0198634 A1 | 8/2007 | Knowles |
| 2007/0198715 A1 | 8/2007 | Knowles |
| 2007/0198716 A1 | 8/2007 | Knowles |
| 2007/0198734 A1 | 8/2007 | Knowles |
| 2007/0218945 A1 | 9/2007 | Agami et al. |
| 2008/0027983 A1 | 1/2008 | Erol et al. |
| 2008/0052781 A1 | 2/2008 | Bogot et al. |
| 2008/0096559 A1* | 4/2008 | Phillips et al. ............ 455/435.2 |
| 2008/0126680 A1 | 5/2008 | Lee et al. |
| 2008/0147962 A1 | 6/2008 | Diggs et al. |
| 2008/0270725 A1 | 10/2008 | Roden et al. |
| 2008/0301396 A1 | 12/2008 | Hamada et al. |
| 2009/0043984 A1 | 2/2009 | Chang et al. |
| 2009/0094160 A1 | 4/2009 | Webster et al. |
| 2009/0171891 A1 | 7/2009 | Nochimowski et al. |
| 2009/0171911 A1 | 7/2009 | Nochimowski et al. |
| 2009/0172050 A1 | 7/2009 | Nochimowski et al. |
| 2009/0172274 A1 | 7/2009 | Nochimowski et al. |
| 2009/0172275 A1 | 7/2009 | Nochimowski et al. |
| 2009/0172276 A1 | 7/2009 | Nochimowski et al. |
| 2009/0172400 A1 | 7/2009 | Rave et al. |
| 2009/0172694 A1 | 7/2009 | Nochimowski et al. |

FOREIGN PATENT DOCUMENTS

| | | |
|---|---|---|
| JP | 2002-163577 A | 6/2002 |
| JP | 2003-058487 A | 2/2003 |
| JP | 2005-056077 A | 3/2005 |
| JP | 2005-522098 A | 7/2005 |
| WO | WO 01/88780 | 11/2001 |
| WO | WO 2005/125072 | 12/2005 |
| WO | WO 2006/014791 | 2/2006 |
| WO | WO 2007/019258 | 2/2007 |
| WO | WO 2007/044947 | 4/2007 |
| WO | WO 2007/138584 | 12/2007 |

OTHER PUBLICATIONS

Sim Application Toolkit (SAT) [online], May 19, 2007 [retreived on Dec. 13, 2010], Retrieved from the Internet:<URL: http://www.sanjayahuja.com/tutorials/SimApplicationToolkit.html>, pp. 1-8.*
Anciaux et al., "A Tamper-Resistant and Portable Healthcare Folder," International Journal of Telemedicine and Applications, vol. 2008, 9 pgs., 2008.
Baird et al., "Distributed Information Storage Architecture," Twelfth IEEE Symposium on Mass Storage Systems, 1993, pp. 1051-9173.
Melazzi et al., "The Simplicity Project: easing the burden of using complex and heterogeneous ICT devices and services," URL: http://www.ist-simplicity.org/_publications/Mobile%20Summit%202004%20-%20Paper%20State%20of%20Art.pdf, 8 pages.
U.S. Appl. No. 11/964,060, filed Dec. 26, 2007.
U.S. Appl. No. 11/967,938, filed Dec. 31, 2007.
Wang, Jinghua, "VHE Smart Card Manager," URL: http://jerry.c-lab.de/vhelab/r_smartcard.html, Feb. 7, 2003.
www.allinyourpocket.com, "All your files in your pocket!" downloaded Apr. 15, 2008.
International Search Report dated Aug. 7, 2009 in PCT Application No. PCT/US2008/087695.
Written Opinion dated Aug. 7, 2009 in PCT Application No. PCT/US2008/087695.
Potter et al., "WebPod: Persistent Web Browsing Sessions with Pocketable Storage Devices," Proceedings of the 14th International Conference on the World Wide Web, [Online] May 14, 2005, pp. 603-612.
Lahti et al., "A Mobile Phone-based Context-aware Video Management Application," Proceedings of SPIE—The International Society for Optical Engineering 2006 SPIE, vol. 6074.
Ravi et al., "Securing Pocket Hard Drives," IEEE Pervasive Computing, IEEE Service Center, Los Alamitos, CA, vol. 6, No. 4, Oct. 1, 2007, pp. 18-23.

Search Report dated Sep. 10, 2010 in EP Application No. 10 007 973.0.
Office Action dated Oct. 6, 2010 in U.S. Appl. No. 12/059,107.
Office Action dated Oct. 5, 2010 in U.S. Appl. No. 12/123,304.
Office Action dated Sep. 3, 2010 in U.S. Appl. No. 12/123,252.
Office Action for U.S. Appl. No. 12/059,107, dated Apr. 4, 2011, 9 pages.
Office Action for U.S. Appl. No. 12/029,356, dated Dec. 27, 2010, 13 pages.
Office Action for U.S. Appl. No. 12/029,356, dated Mar. 25, 2011, 40 pages.
Office Action for U.S. Appl. No. 12/123,304, dated Mar. 11, 2011, 12 pages.
Office Action for U.S. Appl. No. 12/101,065, dated Dec. 7, 2010, 8 pages.
Office Action for U.S. Appl. No. 12/101,065, dated Feb. 25, 2011, 8 pages.
Office Action for U.S. Appl. No. 12/177,006, dated Nov. 24, 2010, 11 pages.
Office Action for U.S. Appl. No. 12/177,006, dated Mar. 15, 2011, 8 pages.
Mani et al., SenSys '06, Nov. 1-3, 2006, Boulder, Colorado, USA ACM, pp. 425-426.
Zeinalipour-Yazti et al., "MicroHash: An Efficient Index Structure for Flash-Based Sensor Devices," FAST 05, pp. 1-14.
State Intellectual Property Office of the People's Republic of China; Text of the First Office Action; Application No. 201010506295.1, dated Nov. 5, 2012, 14 pages.
Office Action for U.S. Appl. No. 12/045,472, dated May 9, 2011, 12 pages.
Notice of Allowance for U.S. Appl. No. 12/045,472, dated Oct. 27, 2011, 5 pages.
Office Action for U.S. Appl. no. 12/123,252, dated Apr. 11, 2011, 12 pages.
Office Action for U.S. Appl. No. 12/123,252, dated Oct. 21, 2011, 13 pages.
Office Action for U.S. Appl. No. 12/177,006, dated Dec. 6, 2011, 10 pages.
Examiner's Report for European Patent Application Serial No. 08 870 111.5, dated Jan. 20, 2011, 6 pages.
European Search Report for European Patent Application Serial No. 10 007 974.8, dated Jan. 20, 2011, 6 pages.
Office Action for U.S. Appl. No. 12/059,107, dated Jan. 3, 2012, 7 pages.
Office Action for U.S. Appl. No. 12/101,065, dated Feb. 9, 2012, 9 pages.
Office Action for U.S. Appl. No. 12/036,440, dated Mar. 5, 2012, 27 pages.
Ex Parte Quayle Action for U.S. Appl. No. 12/019,573, dated Jul. 17, 2012, 5 pages.
Notice of Allowance for U.S. Appl. No. 12/036,440, dated Jun. 22, 2012, 14 pages.
Office Action for U.S. Appl. No. 12/101,065, dated Jun. 19, 2012, 10 pages.
Office Action for U.S. Appl. No. 12/123,252, dated Jul. 2, 2012, 13 pages.
Notice of Allowance for U.S. Appl. No. 12/177,006, dated May 30, 2012, 10 pages.
Office Action for U.S. Appl. No. 13/355,146, dated Jul. 16, 2012, 17 pages.
Kubiatowicz et al., "OceanStore: An Architecture for Global-Scale Persistent Storage", *A.C.M.*, 2000, pp. 190-201.
Notice of Allowance for U.S. Appl. No. 12/019,573, dated Oct. 10, 2012, 8 pages.
Notice of Allowance for U.S. Appl. No. 12/036,440, dated Sep. 26, 2012, 19 pages.
Notice of Allowance for U.S. Appl. No. 12/045,472, dated Sep. 13, 2012, 5 pages.
Notice of Allowance for U.S. Appl. No. 12/177,006, dated Oct. 4, 2012, 9 pages.
Office Action for U.S. Appl. No. 13/355,146, dated Nov. 28, 2012, 17 pages.
Office Action for Japanese Patent Application Serial No. 2010-541483, dated Dec. 4, 2012, 11 pages.

* cited by examiner

DISTRIBUTED STORAGE SERVICE SYSTEMS AND ARCHITECTURE

CROSS REFERENCE TO RELATED APPLICATIONS

This patent application takes priority under 35 U.S.C. 119 (e) to (i) U.S. Provisional Patent Application No. 61/018,644 filed on Jan. 2, 2008 entitled "DISTRIBUTED STORAGE SERVICE SYSTEMS AND ARCHITECTURE" by Nochimowski et al., and (ii) U.S. Provisional Patent Application No. 61/018,979 filed on Jan. 4, 2008 entitled "DISTRIBUTED STORAGE SERVICE SYSTEMS AND ARCHITECTURE" by Nochimowski et al., each of which are incorporated by reference in their entirety for all purposes.

This application is related to co-pending U.S. patent application Ser. Nos. i) Ser. No. 12/029,356 entitled "STORAGE DEVICE HAVING DIRECT USER ACCESS," by Nochimowski et al., filed Feb. 11, 2008; ii) Ser. No. 12/036,440 entitled "CACHE MANAGEMENT" by Nochimowski et al., filed Feb. 25, 2008; iii) Ser. No. 12/045,472 entitled "DIGITAL CONTENT DISTRIBUTION AND CONSUMPTION," by Rave et al., filed Mar. 10, 2008; iv) Ser. No. 12/101,065 entitled "STORAGE DEVICE HAVING REMOTE STORAGE ACCESS", by Nochimowski et al., filed Apr. 10, 2008; v) Ser. No. 12/059,107 entitled "DATA USAGE PROFILING BY LOCAL STORAGE DEVICE," by Nochimowski et al., filed Mar. 31, 2008; vi) Ser. No. 12/123,252 entitled "DATA INDEXING BY LOCAL STORAGE DEVICE," by Nochimowski et al., filed May 19, 2008; vii) Ser. No. 12/123,304 entitled "DATA INDEXING BY LOCAL STORAGE DEVICE," by Nochimowski et al., filed May 19, 2008; and this application is also related to co-pending U.S. patent application Ser. No. 11/967,938 entitled "LOCAL PROXY SYSTEM AND METHOD" by Mosek et al., filed Dec. 31, 2007, all of which are incorporated by reference for all purposes.

FIELD OF THE INVENTION

The present invention relates generally to digital devices. More particularly, the present invention relates to providing cross platform mass storage services for digital devices.

BACKGROUND

Mass storage devices (such as FLASH memory that includes SD and MMC type mass storage devices) have increased greatly in both storage capacity and in the capabilities (i.e., processing resources) of associated mass storage device controllers. This increase in available storage capacity has had a synergistic effect on the general availability of devices whose capabilities can depend greatly on available memory. Such devices include portable digital devices such as portable media players, interactive personal communication devices (cell phones, PDAs, etc.) and the like. In this way, a digital consumer's exposure to digital products that rely upon the storage capability of mass storage devices such as FLASH memory has greatly increased. Exposure that typically spans across multiple devices—connected or unconnected—or access modes—wired vs. wireless, fixed vs. mobile etc.—each having specific storage requirements. Unfortunately, however, as a result of this vast increase in available devices, a digital consumer's storage management can be fragmented with personal content spread across various locations, various devices, and managed in a 'silo mode' resulting in content not synchronized, backed-up etc. For example, a consumer can possess a cell phone, a PDA, a multimedia player, a tablet PC, each of which can have different manufacturers, used different operating systems, different storage protocols, etc.

A number of attempts at solving the problem of fragmented management of the digital consumer's digital data have been proposed. It should be noted, however, that a large proportion of legacy digital devices (particularly those that include FLASH type mass storage) are based upon a master/slave paradigm in that a host device (as master) is coupled by way of a legacy interface to a legacy slave device that typically takes the form of a logical block addressing (LBA) mass storage device. In particular, the master/slave paradigm dictates that the legacy mass storage device and its contents be fully managed by the host device (including a host device file system). In this way, the host device and legacy storage device are locked into a master/slave relationship imposed by the physical link connecting them in that it is the host device (and in some cases, but not all, the host file system) that initiates all transactions between the host device and the legacy mass storage device. Therefore, the master/slave paradigm between host device and legacy mass storage device whereby the host device manages the legacy mass storage device using various LBA commands, poses further constraints on any possible solution.

A proposed solution includes integrating a client agent on the host device. Typically, the client agent is application specific. For example, the client agent can enable back up of the portable memory device, or the client agent can enable "content push" from a server computer to the portable memory device. The client agent can also provide a translation layer into LBA commands as well as provide a platform for processing by the host computer (thereby off-loading the most processor intensive operations from the portable memory device to the host computer). However, using a client agent on the host computer presents its own set of problems. One such problem is related to the heterogeneity of host operating systems, particularly in mobile platforms. This heterogeneity is made even worse in the case of a "closed" operating systems (such as Nucleus) as opposed to that of "open" operating systems such as Windows, Symbian, and the like. Furthermore, only those portable devices compatible with the agent integrated on the host computer can be used, again, limiting the potential market for these portable devices.

Therefore, a method, system, and apparatus that overcomes the structural limitations of legacy mass storage devices while still offering backward compatibility thereby providing richer cross platform storage services is desirable.

SUMMARY OF THE DESCRIBED EMBODIMENTS

According to different embodiments of the present invention, various methods, devices and systems are described for providing distributed storage services. One embodiment describes a computing system that includes at least a host device (HD), a local storage device (LSD) managed by the HD. The LSD does not utilize any interface to a device external to the HD other than that interface provided by the HD. The LSD prompts the HD to execute a requested process with a LSD logical request. The LSD logical request is not created to serve a HD initiated process. The computing system also includes a HD/LSD interface providing a communication path between the HD and the LSD.

In another embodiment, a computing system is described. The computing system includes at least a host device having at least a host device file system, and a local storage device (LSD) coupled to the host device by way of a HD/LSD interface. The LSD does not utilize any interface to a device external to the HD other than that interface provided by the HD. The LSD has at least one storage area managed by the HD. The HD manages the at least one storage area by sending a block command to the at least one storage area by way of the HD/LSD interface. The LSD prompts the HD to execute a requested process with a LSD logical request. The LSD logical request is not created to serve a HD initiated process. The LSD generates the LSD logical request, associates the LSD logical request with a LSD interrupt, and raises the LSD interrupt to the attention of the host device thereby prompting the host device to execute the requested process.

In yet another embodiment, a computing system is disclosed that includes a host device having at least a host device file system (HDFS), and a local storage device (LSD) coupled to the host device by way of a HD/LSD interface. The LSD does not utilize any interface to a device external to the HD other than that interface provided by the HD. The LSD has at least one storage area managed at least by the HD and the HD manages the at least one storage area by sending a block command to the at least one storage area by way of the HD/LSD interface. The LSD responds to a polling of the LSD by the host device with a LSD logical request. The LSD logical request is not created to serve a HD initiated process. The LSD prompts the HD to execute a requested process with the LSD logical request. The polling by the host device is independent of any HDFS initiated process.

In still another embodiment, a method performed by a computing system is described. The computing system includes a local storage device (LSD) having at least one storage area, where the LSD is managed by a host device (HD) by passing at least a block command to the LSD by way of a HD/LSD interface. The LSD does not utilize any interface to a device external to the HD other than that interface provided by the HD. The method can be carried out by performing at least the following operation: prompting the HD by the LSD to execute a requested process with a LSD logical request. The LSD logical request is not created to serve a HD initiated process.

In another embodiment, a computing system is described that includes at least a host device (HD) having at least a host device file system and a LSD driver, and a local storage device (LSD) having at least one storage area managed by the host device file system. The HDFS manages the at least one storage area by generating a block command and passing the block command to the at least one storage area by way of the HD/LSD interface. The system also includes an application in communication with the host device. The application does not utilize any communication paths between the application and either the host device file system or the LSD driver. The application compels the LSD to perform at least one storage operation on the at least one storage area without intervention by the host device file system.

A method performed by a computing system is described. The computing system includes at least a host device (HD) having at least a host device file system and a LSD driver, a local storage device (LSD) having at least one storage area managed at least by the host device file system, and an application in communication with the host device wherein the application does not utilize any communication paths between the application and either the LSD driver or the host device file system. The method includes at least the following operation: compelling the LSD to perform at least one storage operation on the at least one storage area by the application without intervention by the host device file system.

Computer program product executed by a processor included in a computing system having a local storage device (LSD) managed by a host device (HD) wherein the HD manages the LSD by passing at least a block command to the LSD by way of a HD/LSD interface, wherein the LSD does not utilize any interface to a device external to the HD other than that interface provided by the HD is disclosed. The computer program product includes computer code for prompting the HD by the LSD to execute a requested process with a LSD logical request wherein the LSD logical request is not created to serve a HD initiated process and computer readable medium for storing the computer code.

Computer program product executed by a processor in a computing system having at least a host device (HD) having at least a host device file system and a LSD driver, a local storage device (LSD) having at least one storage area managed by the host device file system, and an application in communication with the host device wherein the application does not utilize any communication paths between the application and either the LSD driver and the host device file system is disclosed. The computer program product includes computer code for compelling the LSD to perform at least one storage operation on the at least one storage area by the application without intervention by the host device file system and computer readable medium for storing the computer code.

DETAILED DESCRIPTION OF THE DESCRIBED EMBODIMENTS

Figure 1:
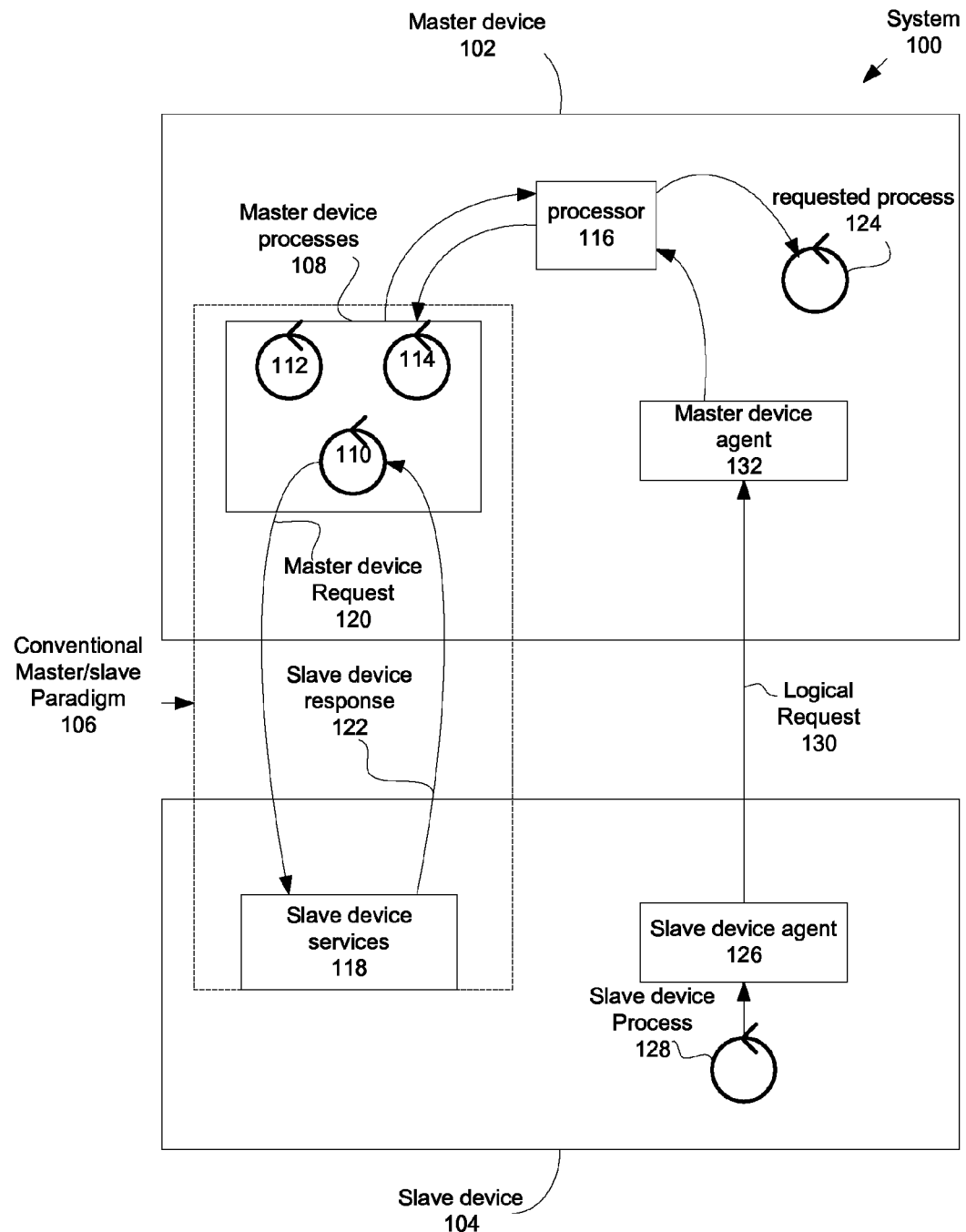
FIG. 1 shows a symbolic representation of a system in accordance with an embodiment of the invention.

Reference will now be made in detail to a particular embodiment of the invention an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

With the increase of the capabilities of storage device controllers, the execution of software applications from within the storage device using processing resources made available by the storage device controllers becomes possible. This enhanced operability of the storage device controllers leads to a paradigm of new (and heretofore impractical) interaction modes such as user-oriented storage services. Such user oriented storage services can be used for improving a user's digital content consumption experience that typically spans across multiple devices—connected or unconnected—or access modes—wired vs. wireless, fixed vs. mobile etc.—each having specific storage requirements.

In order to provide support "user-centric" (as opposed to traditional "device-centric") storage management approach, the invention goes beyond the strict limitations of the host managed, LBA-based mass storage paradigm and provides a storage services paradigm that while fully backward compatible with legacy mass storage devices enhances mass storage with other kinds of interactions. Other kinds of interactions that, for example, allow for storage resources and service building blocks to be potentially distributed across various physical locations (i.e., a data storage device, in a host computer, or across a network).

With this in mind, the storage services paradigm provides that a local data storage device is now capable of 1) interactions with other data storage devices present in the same host computer, or with applications running on a remote server computer, and 2) the interactions can be initiated by the data storage device itself, by a host application or by a remote server.

The invention can further pertain to an electronic system that includes a memory device discussed above. Memory devices (i.e., memory cards) are commonly used to store digital data for use with various electronics products. The memory device is often removable from the electronic system so the stored digital data is portable. The memory devices according to the invention can have a relatively small form factor and be used to store digital data for electronics products that acquire data, such as cameras, hand-held or notebook computers, network cards, network appliances, set-top boxes, hand-held or other small media (e.g., audio) players/recorders (e.g., MP3 devices), and medical monitors.

Embodiments of the invention are discussed below with reference to FIGS. 1-9. However, those skilled in the art will readily appreciate that the detailed description given herein with respect to these figures is for explanatory purposes as the invention extends beyond these limited embodiments. It should be noted that it is contemplated that the invention can be used for any type of local data storage devices that can include non-volatile memory such as Multi Media Card (MMC) and Secure Digital Card (SD).

FIG. 1 shows a symbolic representation of master device/slave system 100 in accordance with an embodiment of the invention. It should be noted that master/slave is a model for a communication protocol where one device or process has unidirectional control over one or more other devices. Once a master/slave relationship between devices or processes is established, the direction of control is always from the master to the slaves. In some systems a master is elected from a group of eligible devices with the other devices acting in the role of slaves. Accordingly, master/slave system 100 (hereinafter referred to simply as system 100) includes master device 102 and slave device 104 that relate to each other, in part, by way of conventional master/slave paradigm 106. It should also be noted that slave device 104 has no interface to any device external to master device 102 other than that provided by master device 102.

Master device 102 can operate a number of master device processes 108. By master device process it is meant a process executed solely for the benefit of the master device. Such master device processes can include any number and type of processes such as, for example, a fetch instruction command useful in providing master device 102 with an executable instruction. Master device processes 108 can include master device processes 110, 112, and 114 each of which can be executed by processing unit 116. Any of the processes 110, 112 or 114 can request service from slave device services 118. Process 110, for example, can request service from slave device service 118 by generating master device request 120. Slave device service 118 can respond to master device request 120 with slave service response 122. For example, master device request 120 can take the form of a READ command and requested slave service response 122 can take the form of DATA. However, within the confines of master/slave paradigm 106, slave device 104 can not prompt nor in any manner cause master device 102 to execute any process outside of master device processes 108. In other words, within the context of conventional master/slave paradigm 106, master device 102 can only execute at least one of the master device processes 108.

However, the invention circumvents conventional master/slave paradigm 106 by allowing slave device 104 to prompt processor 116 to execute requested process 124 for the benefit of slave device 102. In this way, requested process 124 can be executed by processor 116 and yet can be totally independent of and unrelated to any of the master device processes 108. Slave device 104 can include slave device agent 126 that can associate slave device process 128 with slave device logical request 130. Master device 102 can include master device agent 132 in communication with processor 116 and slave device 104 by way of slave device logical request 130. In this way, master device agent 132 can use slave device logical request 130 to prompt processor 116 to execute requested slave device process 124. In this way, a logical request generated by a slave device can be converted into a master device provided physical response unrelated to and independent of any master device initiated process.

The invention will now be described in terms of more specific embodiments all of which are in keeping with the spirit and scope of the invention. It should be noted that any functional blocks or functional arrangements described herein can be implemented as either a physical entity or as a logical entity, or as a combination of both.

Figure 2:
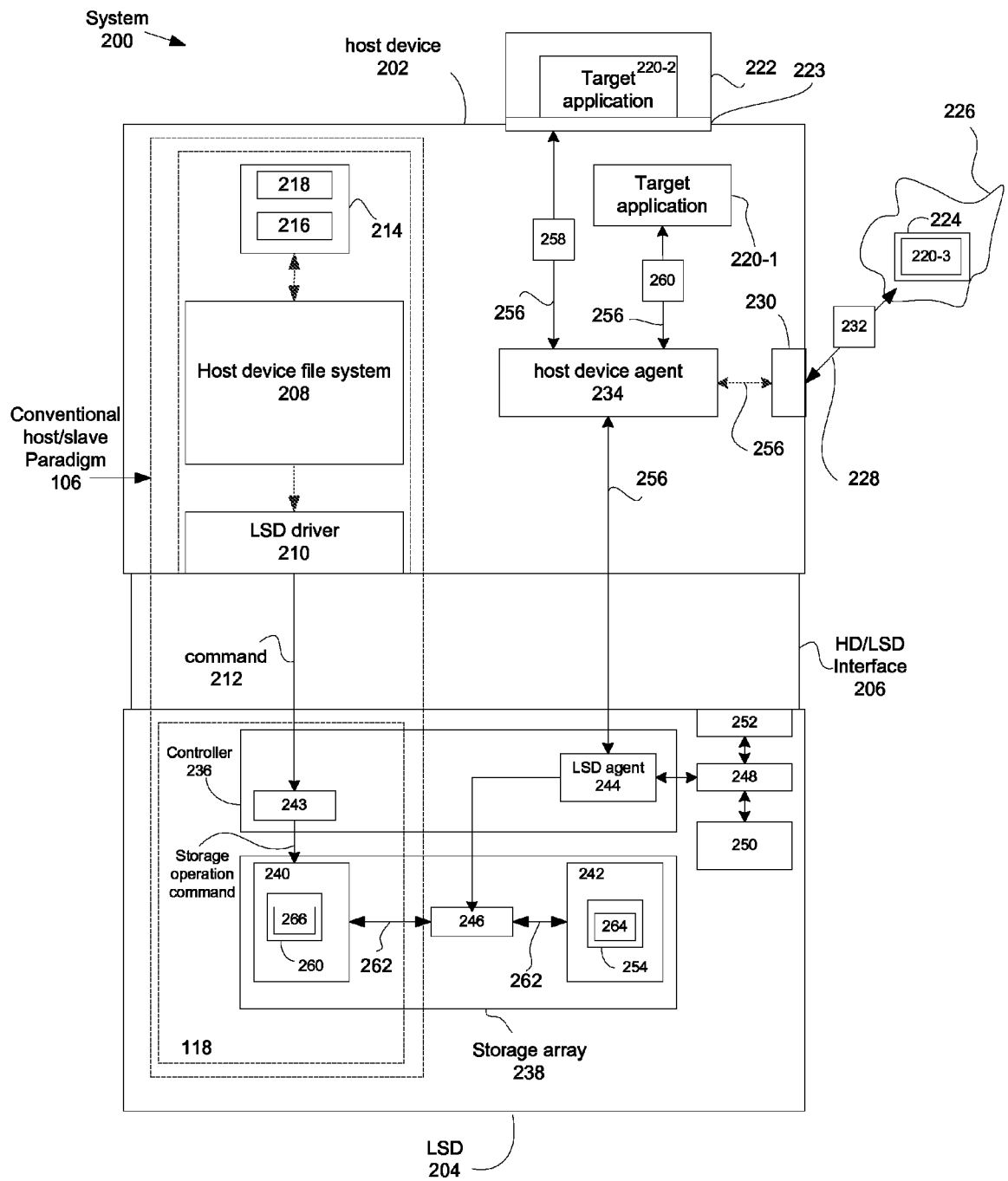
FIG. 2 illustrates a host device/local storage device system in accordance with an embodiment of the invention.

FIG. 2 shows a computing system 200 in accordance with an embodiment of the invention. System 200 can include slave device 104 that can take the form of local storage device (LSD) 204. LSD 204 can take the form of removable memory devices such as a memory card having a relatively small form factor and can be used to store digital data for electronics products such as cameras, hand-held or notebook computers, network cards, network appliances, set-top boxes, hand-held or other small audio players/recorders (e.g., MP3 devices), and medical monitors. Examples of a memory card include PC Card (formerly PCMCIA device), Flash card (e.g., Compact Flash Type I and II), Secure Digital (SD) card, Multimedia card (MMC), ATA card (e.g., Compact Flash card), memory stick, SmartMedia card. In addition, LSD 204 can take the form of non-removable memory devices such as SD compatible iNAND™ embedded Flash drive manufactured by SanDisk Corporation of Milpitas Calif.

LSD 204 can communicate with master device 102 in the form of host device (HD) 202 by way of HD/LSD interface 206. It should be noted that HD/LSD 206 can be configured as a mechanical entity (such as a socket or interconnecting bus) into which HD 202 and LSD 204 can mechanically connect. In some embodiments, HD/LSD 206 can take the form of a wireless interface. Since HD 202 is a master device, HD 202 includes a processor. However, for the sake of clarity, the processor included in HD 202 is neither shown nor mentioned further in this discussion but is, nonetheless, presumed to be present. LSD 204 can be physically connected exclusively to HD 202 and therefore cannot access or otherwise communicate with circuits and/or applications external to computing system 200 without intervention by HD 202. Typically, LSD 204 does not utilize any interface to a device external to HD 202 other than that interface provided by the HD 202.

HD 202 includes host device file system (HDFS) 208 in communication with LSD driver 210. In the described embodiment, HDFS 208 can issue LSD management command 212 to LSD driver 210. LSD driver 210 can, in turn, pass LSD management command 212 (appropriately formatted) to LSD 204 by way of HD/LSD interface 206. For example, LSD management command 212 can take the form of a block command in those cases where LSD 204 is configured to include a data storage array having logical block address (LBA) architecture. HD 202 can also include (internal) software application 214. By internal application it is meant that software application 214 can utilize HDFS 208 and LSD driver 210 to communicate with LSD 204. Such software applications can include host device operating system (HDOS) 216 and application 218 each of which typically resides in host device main memory (that can take the form of a hard disk drive, or HDD, as well as non-volatile memory such as FLASH memory).

In the described embodiment, software application 214 can utilize HDFS 208 and LSD driver 210 to communicate with LSD 204 and is therefore "visible" to HDFS 208. In contrast to application 214, however, external application 220 (referred to hereinafter as target application) does not utilize any communication path between target application 220 and either HDFS 208 and LSD driver 210 to communicate with LSD 204 and is therefore not "visible" to HDFS 208. In the described embodiment, target application 220 can reside in any number of locations and devices, either locally or remotely. Such locations and devices can include, for example, HD 202 (having local application 220-1), or any device external to HD 202 and LSD 204 but still within system 200 such as external device 222 (having local application 220-2). In the described embodiment, external device 222 can take the form of a second LSD 222 coupled by way of interface 223 to HD 202. Moreover, such locations and devices can also include device 224 (having remote application 220-3) that is external to system 200 included in network 226 in communication with HD 202 by way network link 228 at network interface 230. In this way, a communication channel using network link 228 can be established between external device 224 and HD 202 through which information 232 can pass.

HD 202 can communicate with network 226 by way of network interface 230. In the described embodiment network interface 230 facilitates communication between HD 202 and network 226 by way of network link 228. For example if network 226 is an IP protocol type network, then network interface 230 can establish an IP protocol based network link 228 (such as a URL) between, for example, application 218 and any network device (ND) 224 included in network 226. It should be noted that network interface 230 can be physically located anywhere deemed appropriate. For example, network interface 230 can be incorporated into HD 202. However, network interface 230 can also be located in any physical location not included in HD 202 (or system 200) but still be utilized by HD 202 to establish the appropriate network link 228 with network 226. Network interface 230 is therefore not limited to being physically incorporated within or in close proximity to HD 202.

Master device agent 132 can take the form of host device agent 234 that provides in addition to the functions described above with regards to master device agent 124, at least a bridging functionality between storage services provided by LSD 204 and any available external resources. In the described implementation, host device agent 234 can be used to identify a LSD logical request by any means appropriate (such as polling or interrupts described below in more detail). Moreover, host device agent 234 can be configured to route and/or maintain a communication path to/from a target application once established by same. Furthermore, host device agent 234 can be application neutral so as to serve any type of target application.

LSD 204 can include controller 236 and mass storage array 238 having first storage array 240 and second storage array 242. It should be noted that storage array 238 can be formed of an array of memory cells (such as FLASH). In this particular case, even though mass storage array 238 can be presumed to be an array of FLASH memory cells, the invention is not limited to only FLASH type memory cells since it is contemplated that the invention can be used with any appropriate type of memory cell. Controller 236 includes file manager 243 that can manage first storage array 240 within host/LSD paradigm 106 (i.e., acting at the behest of HDFS 208). In a particularly useful arrangement, first storage area 240 can be a LBA based mass storage array. In this way, first storage array 240 is compatible with legacy installed base. Accordingly, the location of blocks of data stored in first storage area 240 can be specified using logical block addressing (LBA) where each block can be, for example, on the order of 512 or 1024 bytes each. In this way, first storage area 240 can be fully backward compatible with any contemplated legacy mass storage architectures (i.e. able to work in conjunction with legacy hosts) and more specifically LBA type systems. In particular, LSD 204 (in particular, first storage area 240) can operate under standard LBA architecture using legacy interfaces, busses, and all associated protocols providing for full compatibility with installed base of legacy products.

Controller 236 can also include LSD agent 244 that can act as a bridge (described below) between first storage area 240 and second storage area 242 using interface 246. LSD agent 244 can also manage a network stack/interface 248 that provides a mechanism for internal LSD applications 250 to communicate with external devices and/or target applications using standard protocols (such as Internet Protocol, or IP) and any available network resources by way of LSD interface 252. In particular, LSD 204 can translate any network communication (such as LSD logical request 130) into a standard format (such as physical bus-based format) so as to enable host device agent 234 to execute instructions (such as a message fetch) in a manner appropriate to an LBA based implementation of HD/LSD interface 206. In this way, any fetched message, for example, can be successfully conveyed over network link 228 created between host device agent 234 and remote application 220-3 (or a local communication path between local applications 220-1 or 220-2 and LSD 204). In this regard, network stack/interface 248 can be considered to be part of LSD agent 244. LSD agent 244 also can provide authentication and security services to LSD application 250 as well as manage any incoming service requests.

Either the first storage area 240 or second storage area 242 (or both) can be partitioned into separate internal regions. These partitioned regions can each be acted upon so that they can interact with each other and/or circuits and/or software applications external to LSD 204 in any appropriate manner. Such external circuitry can include for example, HD 202 (that includes all components therein, such as host file system 208), LSD 222, or any of a number of external devices included in network 226 such as ND 224.

Second storage area 242 can be partitioned to include region 254. In the described embodiment, region 254 can be configured to be "invisible" to HDFS 208 and as such can be designated as covert storage area (CSA) 254. In this way, any data content or changes to data content of CSA 254 cannot be detected by HDFS 208 (unless notified of such). However, HDFS 208 can be notified of any such data content or data content changes. For example, as described in more detail below, any circuit or software application not in communication with HDFS 208 (such as remote application 220-3 residing in ND 224, local application 220-1 in HD 202, and local application 220-2 in LSD 222), can prompt HD 202 to establish communication path 256 between itself and CSA 254 without being visible by HDFS 208. Conversely, LSD 204 can prompt HD 202 to establish communication path 256 between LSD 204 and any designated application 220. Once established, however, information (such as information 232, information 258, and information 260) can be passed without further intervention by HD 202 (except for any intervention related to the passing of data, such as data packet routing) and also being invisible to HDFS 208. In some cases, however, CSA 254 can provide notification to HDFS 208 of any such changes.

First storage area 240 can be partitioned to include region 260. In the described embodiment, region 260 can be fully accessible to HDFS 208 or any other appropriate external circuit so long as the communication is mediated by HDFS 208 (using, for example, LBA based commands as described in some detail above in some embodiments). Therefore, region 260 can be designated as host storage area (HSA) 260 in keeping with the fact that host device file system 208 manages HSA 260. In one aspect of the invention, CSA 254 and HSA 260 can communicate with each other by way of interface 246 that is independent of HDFS 208. In the described embodiment, as part of LSD agent 244, interface 246 can bridge first storage area 240 and second storage area 242. LSD agent 244 can include an internal file management system (e.g. LSD FS) that can read, for example, a file allocation table (FAT) managed by HDFS 208. LSD agent 244 can also write to/from CSA 254 to HAS 260 using, for example, a placeholder file having dummy content. In this way, CSA 254 and HSA 260 can communicate with each other over communication path 262 unseen by HDFS 208. In some cases, all (or only portions) of CSA 254 and/or HSA 260 can be designated as protected portions 264 and 266, respectively. By protected it is meant that HDFS 208 can not gain access to these protected regions unless authorized. Such authorization can be provided by a device external to computing system 200 such as, for example, an authorization server. As described above, LSD 204 can prompt HD 202 to execute requested process 124 for the benefit of LSD 204. It should be noted that even in those cases where a host command (e.g. read/write) triggers the generation of LSD logical request 130, LSD logical request 130 does not serve the host command.

Figure 3A:
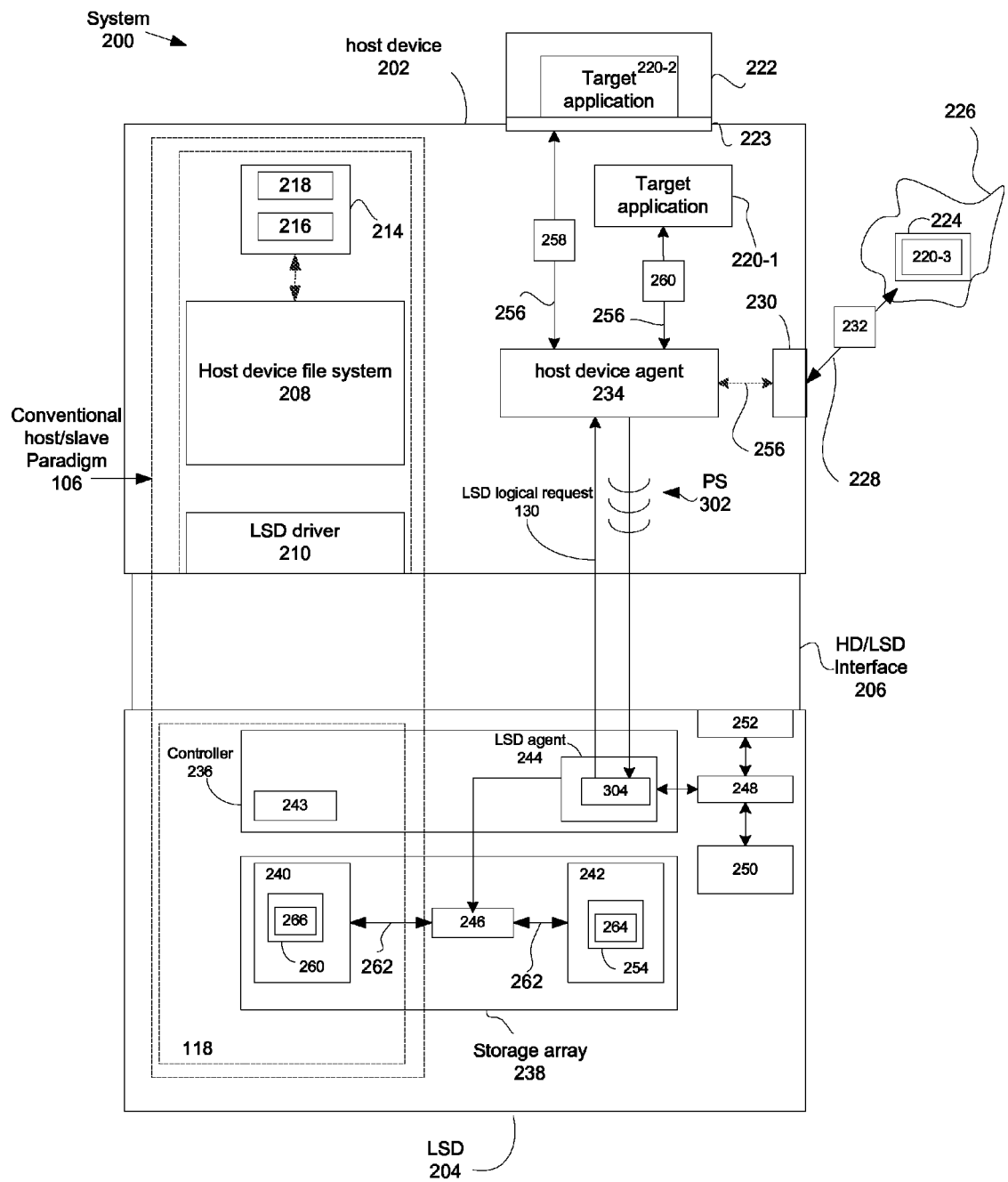
FIGS. 3A and 3B shows a computing system in accordance with an embodiment of the invention.

In this way, requested process 124 can be totally independent of and unrelated to any of the host device processes 108. In particular, LSD 204 can prompt HD 202 to, for example, establish network link 228 and/or establish communication path 256 to either local applications 220-1 and/or 220-2 all without being visible to HDFS 208. However, once requested process 124 has been executed (i.e., the appropriate communication path established, for example) any further intervention by HD 202 is unnecessary (except for any routing or other housekeeping functions). HD 202 can be prompted by LSD 204 to execute LSD logical request 130 in a number of ways. For example, FIG. 3A illustrates a polling scheme 300 in accordance with an embodiment of the invention. HD 202 can poll LSD 204 by sending polling signal (PS) 302 to LSD 204 that is intercepted by LSD agent 244.

In the described embodiment, LSD agent 244 can include logical request generator 304 that responds to PS 302 by generating LSD logical request 130. Logical request generator 304 subsequently forwards LSD logical request back to host device agent 234. It should be noted that the described polling process is not conditional upon the need or expectation of HD 202 for a specific response from LSD 204. In this way, LSD 204 can at any time prompt HD 204 to execute requested process 124 by simply responding to polling signal 302 with LSD logical request 130. In the described embodiment, LSD logical request 130 includes command information that can prompt HD 202 execute LSD requested process 124. It should be noted that command information can include data such as a command code indicative of a particular operation to be completed by HD 202 (such as setting up communication channel 256).

The command information can also include device information such as target device identification (ID), target device location (IP address, for example), etc. In some cases, however, neither LSD 204 nor HD 202 has sufficient information at hand to complete a required task. For example, LSD 204 can provide command information indicating a particular operation but lacks a particular target device ID or target device location. In these situations, it may be possible to utilize a discovery server computer that can be queried by LSD 204 by way of network link 238, for example, in order to obtain the missing yet necessary information. For example, LSD 204 can initiate a storage operation on a target storage device simply by responding to PS 302 at any time with LSD logical request 130. LSD logical request 130 can include a command with instructions for HD 202 to establish a communication channel between LSD 204 and the target storage device. It should be noted that the target storage device can be in any location so long as HD 202 can establish an appropriate communication channel. For example, if the target storage device is ND 224 in network 226, then HD 202 can respond to LSD logical request 130 by establishing network link 228 between network interface 230 and the ND 224.

Figure 3B:
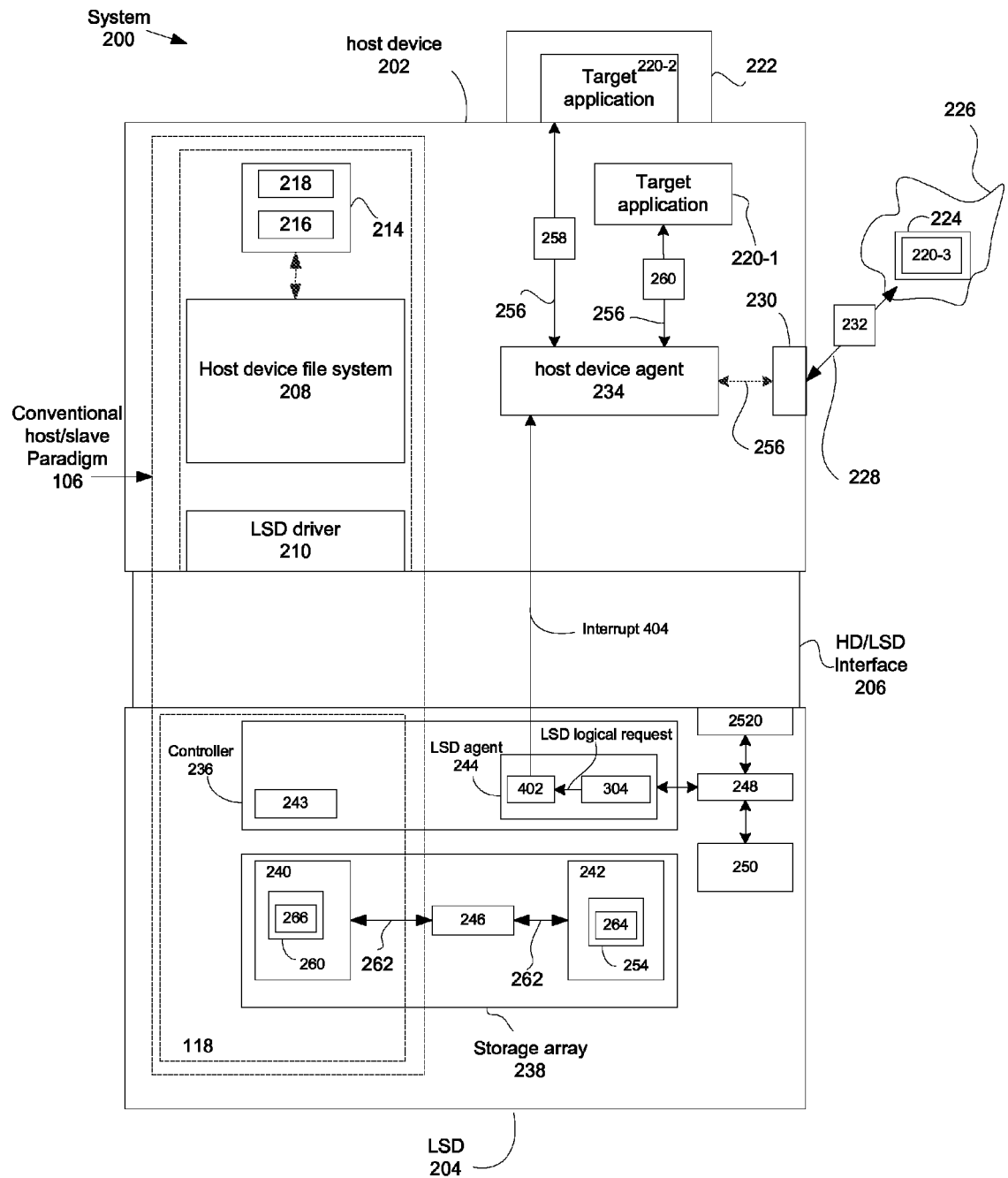

Another mechanism by which LSD 204 can prompt HD 202 to execute requested process 124 is described in terms of a LSD generated interrupt illustrated in FIG. 3B. LSD 204 can prompt HD 202 to execute requested process 124 by using LSD interrupt associator 402 to associate LSD logical request 130 received from LSD logical request generator 304 with LSD generated interrupt 404. Once LSD logical request 130 has been associated with LSD interrupt 404, LSD 204 raises interrupt 404 to the attention of HD 202. HD 202 responds to logical request 130 associated with LSD interrupt 404 by executing requested process 124.

LSD 204 can also direct HD 202 to establish communication with other local storage device(s) such as second LSD 222. For example, computing system 200 can be a portable media player (in which case LSD 204 stores various digital media files such as audio files in the form of MP3) that can be coupled to a personal computer in order to, for example, synchronize media files between second LSD 222 and LSD 204. In this example, LSD 204 can initiate an appropriate synchronization operation whereby data content between both LSD 222 and LSD 204 are compared and updated invisible to HDFS 208.

In another example, LSD 204 can perform any number of operations, generate a result and based upon that result, generate an associated logical request. The logical request can then be used by LSD 204 to prompt HD 204 to execute an appropriate LSD process. For example, LSD 204 can perform a detection of a set of LSD parameters operation. In the described embodiment, the set of LSD parameters detected can include parameter such as a data content back-up parameter, a data content parameter (such as a file size, a file type, a file name, and a file keyword), a logical storage parameter (such as a remaining capacity, and a LSD IP address, if appropriate), a physical storage parameter (such as a wear level, a number of bad blocks, a number of bit flips), a violation of rules parameter, and a host device IP address. Once LSD 204 has completed the detection operation, a detection operation result is generated. It should be noted that in some cases, the result generated is a NULL result in that the detected parameters fall within a set of rules governing the operation of the LSD. However, in other cases, the result generated can be associated with LSD logical request 130 as detection logical request 130 that can prompt HD 202 to establish a communication path to a target application. Such target applications can include local applications 220-1, 220-2 or remote application 220-3. It should be noted that in the case of local applications 220-1 and 220-2, the communication path is referred to as a local communication path. Once such a communication path has been established, LSD 204 and target application 220 can logically interact in order to perform a requested detection process. It should be noted that once the communication path has been established, no further intervention by HD 202 is required except for maintaining the communication path and any other housekeeping duties. The requested detection process can include a content backup process, a content sharing process, an event notification process, a request for a remote instruction process, a request for usage/access right process, a registration to a remote server process.

In one embodiment, LSD 204 associates the detection logical request with the polling by the host device. In other embodiments, however, LSD 204 associates the detection logical request with a LSD interrupt and raises the LSD interrupt to the attention of HD 202. In either case, HD 202 can be prompted to execute the appropriate requested detection process.

Figure 4:
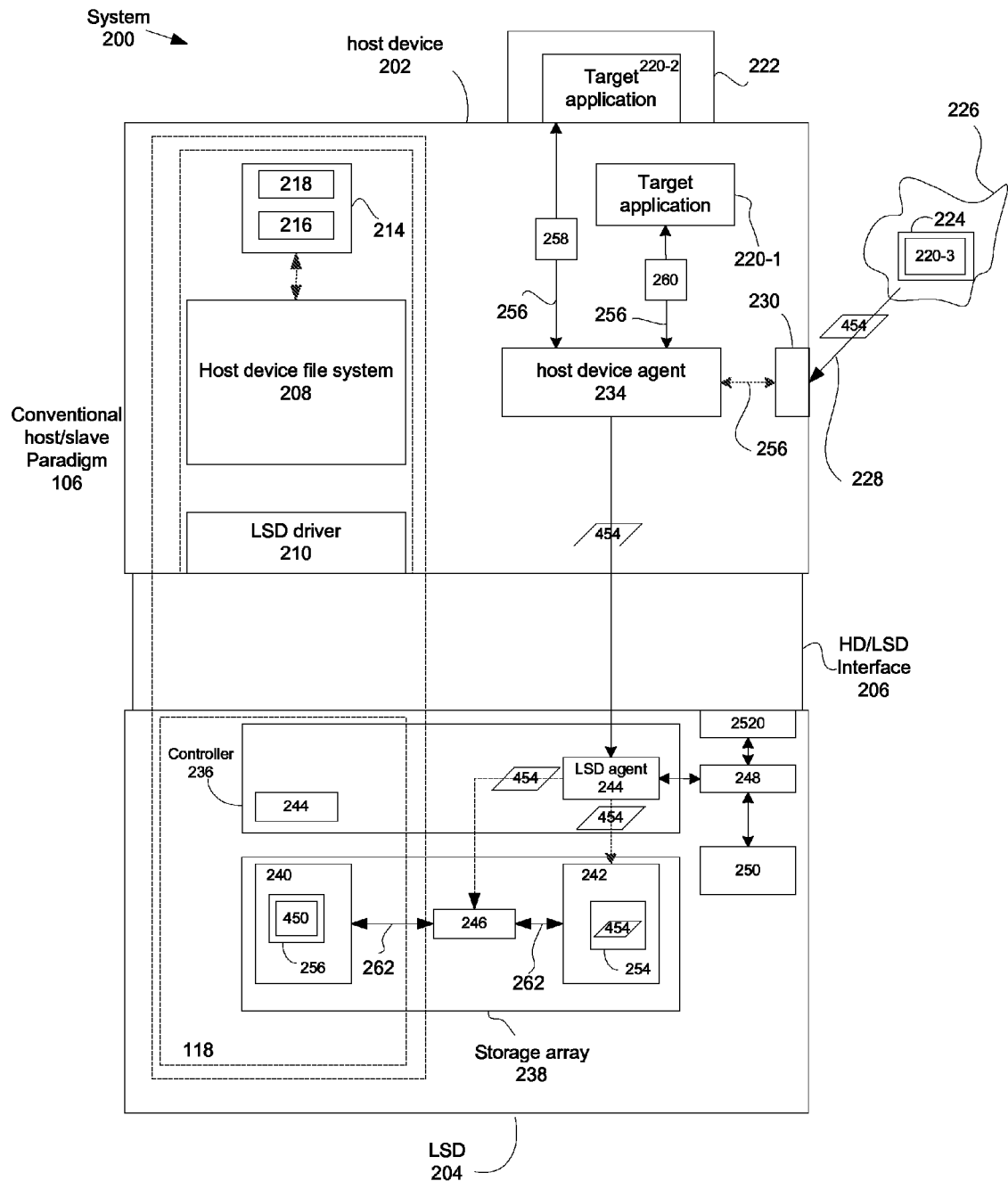
FIG. 4 shows a computing system in accordance with an embodiment of the invention.

It should be noted that the invention is essentially symmetric in that any circuit or software application external to LSD 204 and/or system 200 can target LSD 204 using HD 204 as a mechanism to establish a communication path between the requesting device and target device, LSD 204. In this way, LSD 204 can respond to requests (such as provide current status information, current capacity, etc.) that originate from external circuits or external software applications. For example, FIG. 4 illustrates a situation whereby remote application 220-3 compels first storage area 240 to perform any of a number of storage operations independent of HDFS 208. For example, external application 220-3 can write data to storage area 240 by writing data to a pre-established proxy file 450 (also referred to as a placeholder file) that is visible and therefore manageable by host device file system (HDFS) 208. However, any data content included in placeholder file 450 can be considered "dummy" data in that placeholder file 450 is merely a part of the mechanism whereby remote application 220-3 can access/change data within proxy file without being "seen" by HDFS 208 (unless notified).

For example, external application 220-3 can write data 454 to placeholder file 450 without intervention of HDFS 208 by forwarding data 454 to be written to placeholder file 450. In one implementation, data 454 can be sent directly to placeholder file 450 or use CSA 254 as a cache to buffer selected portions of data 454. When CSA 254 is used to cache data 454, data 454 is passed to placeholder file 450 by way of communication path 256 without intervention by HD 202 (except for the establishing communication path 256). In this way, remote application 220-3 (or any external application 220 for that matter) can write data to placeholder file 450 or can stream data 454 from placeholder file 450 without intervention by HDFS 208.

For example, LSD 204 can perform a detection operation that determines that the available storage capacity of first storage array 240 is less than a predetermined amount. Based upon that result, LSD logical request generator 340 can generate a LSD detection logical request 130 that prompts HD 202 to establish communication path 228 between LSD 204 and remote application 220-3. Once communication path 228 has been established, HD 202 can have no intervention since HD 202 is now assuming a role commensurate to a modem, router, or other such device used to route data packets, for example. Once remote application 220-3 and LSD 204 are linked by way of communication path 228, LSD 204 and remote application 220-3 can logically interact over communication path 228. For example, LSD 204 can forward results of the detection operation to remote application 220-3. Remote application 220-3 can respond by pushing (writing) data 454 (in the form of a user notification, advertisement, etc.) to placeholder file 452. Once data 454 is stored in placeholder file 452, data 454 is now visible to HDFS 208 and can be processed by HD 202 in any number of ways. For example, data 454 can be used by HD 204 to display a notification that additional storage capacity is required and even suggest a product to purchase and where it can be purchased and for what price.

Figure 5A:
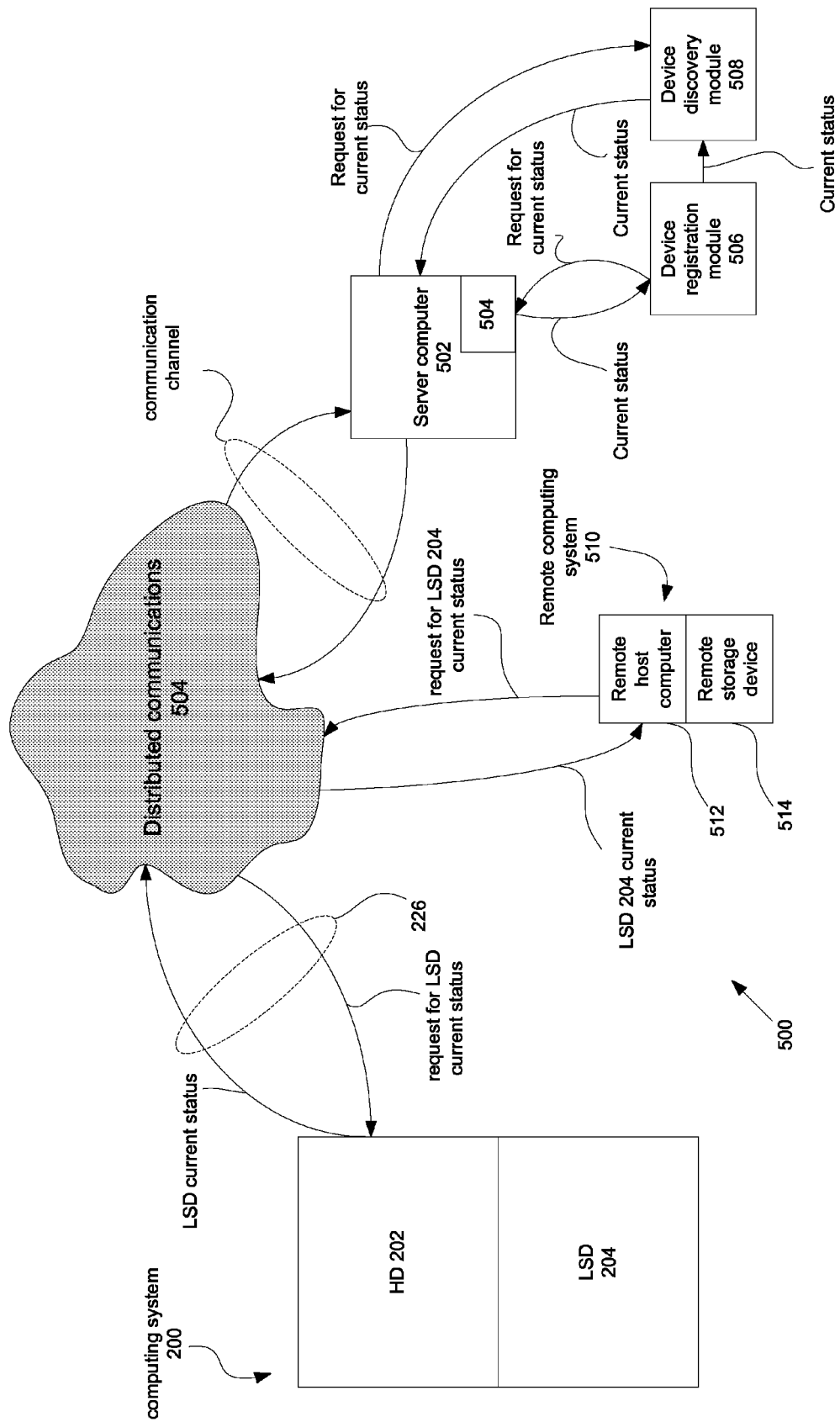
FIGS. 5A-5B show a more detailed view of network shown in FIG. 3.

FIG. 5A shows a more detailed view of network 500 in accordance with an embodiment of the invention. In particular, network 500 is one embodiment of network 226 shown in FIG. 3. In particular, network 500 is shown to include server computer 502 coupled to computing system 200 by way of distributed communication channels. Such distributed communication channels can include wireless communications (WiFi, Bluetooth, etc.) as well as wired communications, etc. In the described embodiment, server computer 502 includes server component 504 that provides, in part, some clear and well defined interfaces, using, for example, standard Web technology e.g. HTTP/SOAP-based Web Services to developers and other users. In the described embodiment, server component 504 that can provide at least authorization and authentication services whenever a secure channel between a remote application and LSD 204, for example, is required. In this way, an efficient guard against possible network-originated attacks, spywares, malwares etc. can be provided. Furthermore, privacy protection, in order to ensure the end user content usage cannot be tracked by unauthorized third party, optimized communication protocol with the storage device possibly using some compression techniques and the server computer can also include broadcast and/or multicast capabilities. Device registration module 506 and/or discovery services module 508 can be included in or coupled to server computer 502.

Device registration module 506 and discovery services module 508 provide, respectively, a registration service and discovery service. By registration service it is meant that any device included in, added to, or removed from network 226 that is registered to device registration module 506 has associated registration data updated consistent with a current status of the corresponding device. Such registration data can include device type, device location (IP address if the network is an IP protocol based network), etc.

In one embodiment, registration data associated with a device (or software application) can be updated by registration module 506 in a number of different ways. One approach relies upon the registration module 506 being notified that a device status has changed (i.e., the device has been added, removed, or has moved location within network 226, etc.). In some aspects of the invention, in order to preserve processing resources as well as network bandwidth, not all changes are considered of sufficient interest to notify registration module 506. However, in those situations when a device status change has occurred and notice is warranted, registration module 506 can be notified of the status change by registration module 506 continually pinging all devices included in network 226 and requesting each device return current status information. Any status information that has changed with regards to a previous device status and that has been determined to represent a notifiable status change will invoke a notice event at device registration module 506.

In response to the notice event, registration module 506 can request that the device having the changed status forward current device status information to registration module 506. Once received by registration module 506, the status information associated with the device can be updated at registration module 506 and forwarded to discovery server 508. Another approach can have device registration module 506 taking on a more passive approach in that each device can forward its particular current status to device registration module 506 whenever a change in status has occurred. Again, in order to preserve computing resources and network bandwidth some aspects of the invention only provide for reporting only certain status changes and not all status changes.

In any case, once current status information has been received and appropriately processed, registration module 506 can forward the current status information to discovery services module 508 where it can be stored to provide subsequent discovery services to requesting devices and or software application. Such information can include any information related to any device included in network 324 in order to facilitate, for example, establishing a communication channel between the requesting device (including software applications, if any) and target device or target applications.

Still referring to FIG. 5A, if LSD 222 has not been previously coupled with HD 204 but at some point LSD 222 is coupled to HD 204 by inserting LSD 204 into interface 223 (for example, inserting a Secure Digital (SD) card into a portable computer, digital camera in communication with a network, etc.) then LSD 222 can, in one aspect of the invention, notify device registration service 506 that it has joined network 226. In yet another aspect of the invention, however, device registration service 506 can actively determine that LSD 222 has entered network 226 by, for example, pinging computing system 200 and determining that a notifiable change has occurred.

In the case where LSD 222 actively notifies device registration service 506 of a change in status (which in this case is that LSD 222 has been added to network 226), LSD 222 can request HD 202 to establish a communication channel between LSD 222 and device registration service 506 that includes network link 228 from HD 202 to network 226 and communication channel 510 from network 226 to registration service 506, using at least one of the mechanisms described above. It should be noted that if LSD 204 does not know the location of device registration service 506, then either HD 202 will provide the location as a default location or network services will automatically direct status changes to a pre-defined location.

Once communication between LSD 204 and registration service has been established, then device registration service 506 can update (either passively or actively) the current status of LSD 222 (where the current status of LSD 222 is either pushed by LSD 222 or pulled by registration server 506). Once updated, device registration service 506 can then forward the current status of LSD 222 to discovery services module 508 where it is stored for subsequent retrieval whenever a remote device targets LSD 222. It should be noted that registration information can include any relevant information related to the device. Such relevant information (in the case of a data storage device) can include logical storage device parameters (remaining available storage capacity, device IP address, available storage applications on the device, firmware version and characteristics, etc.) that are more of a fixed characteristic of the device. Such information can also include more transitory information such as currently available data storage capacity, quality of stored data, location of device, etc. as well as data content parameters that can include a file size, a file type, a file name, and a file keyword.

Once discovery service 508 has been updated, discovery service 508 can provide requested discovery information to any requesting device (or software application) about any target device (or target software application) having data stored therein. For example, remote computing device 510 having remote host device 512 coupled with remote storage device 514, can remotely invoke a storage operation on a target device such as LSD 204 using discovery service 508 by first establishing a communication channel between remote computing device 510 and LSD 204. The communication channel can be established by remote computing device 510 sending a discovery request 516 to discovery service 508 requesting discovery information for target device LSD 204. Such discovery information can include target device location information, target device current operating status information, target device current parametric information, etc. In response to the discovery request, discovery service 508 can forward a discovery server response 518 that includes the appropriate target device discovery information back to the requesting device (i.e., remote computing device 510).

Figure 5B:
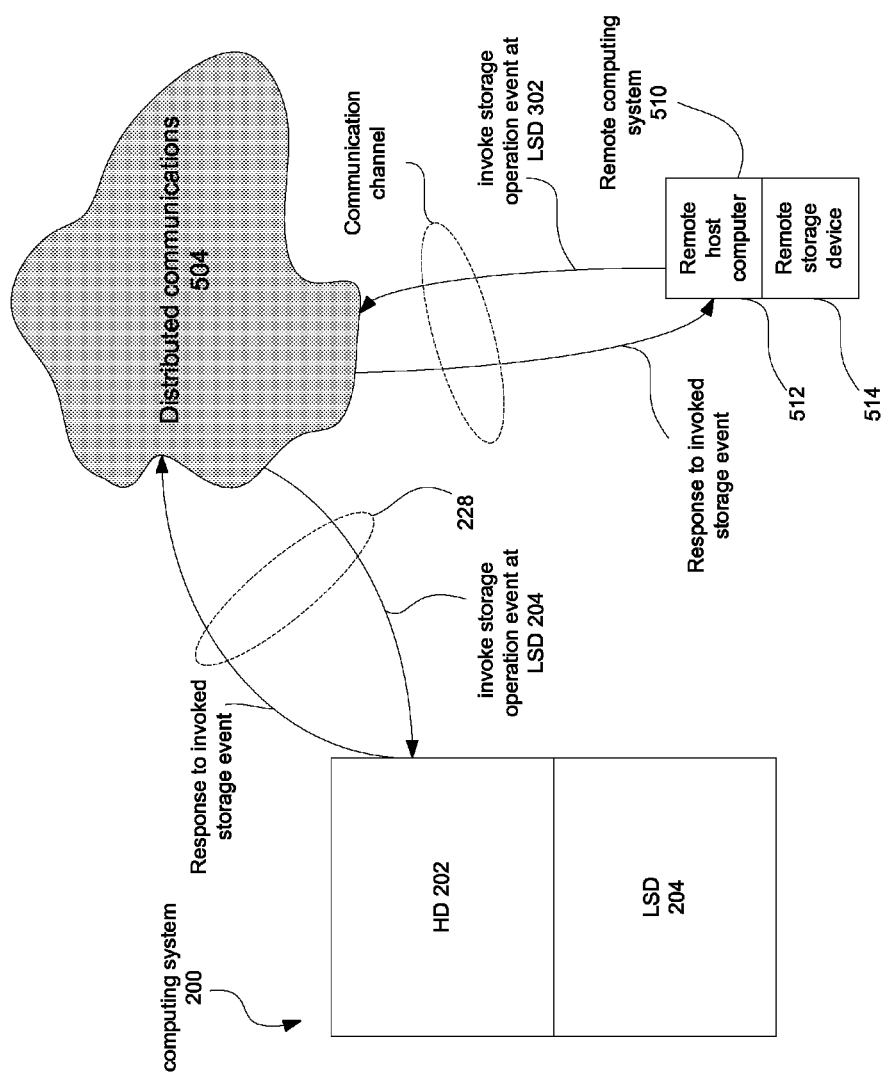

Once remote computing device 510 has received the appropriate target discovery information regarding target device LSD 204, then as shown in FIG. 5B, remote computing device 510 can establish a communication channel between target device LSD 204 (using HD 104 as a conduit) that includes at least network link 228. Once the communication channel has been established between target device LSD 204 and remote computing device 510, then remote computing device 510 can remotely invoke any number and types of storage operations on target device LSD 204. Such operations can include, for example, reading, writing, and/or erasing data.

Figure 6:
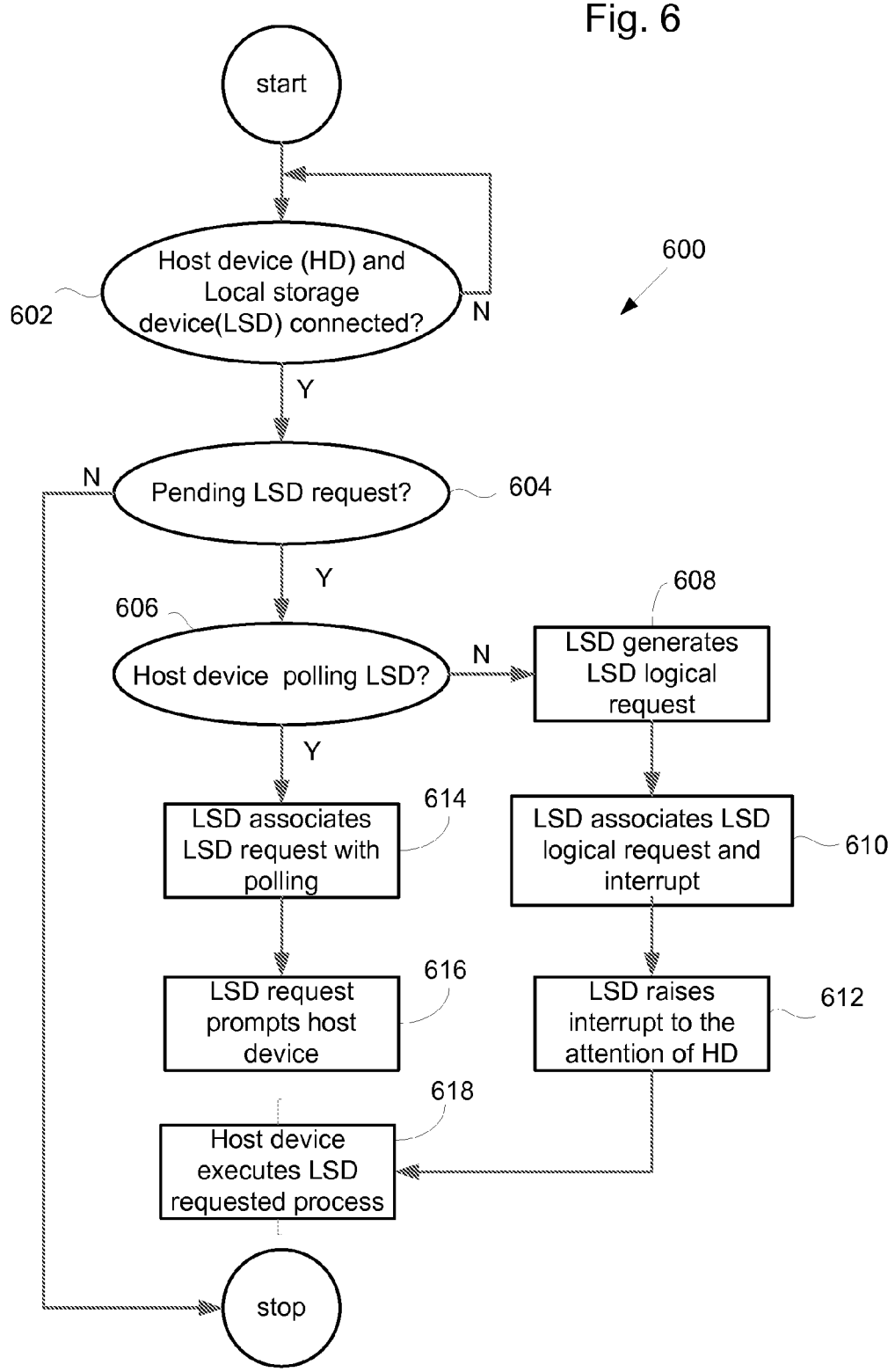
FIG. 6 shows a flowchart detailing a process in accordance with an embodiment of the invention.

FIG. 6 shows a flowchart detailing a process 600 in accordance with an embodiment of the invention. Process 600 begins at 602 by determining if a host device is in communication with a local storage device. By communication it is meant that the host device and local storage device have a capable communication channel established between them. By capable communication, it is meant that there is a physical connection established, a wireless connection established, or a logical connection established between the host device and the local storage device over which information can be passed. Once it has been determined that a capable communication path exists between the host device and the local storage device, then at 604 a determination is made if the local storage device has a pending LSD initiated event. By LSD initiated event it is meant an event unrelated to and independent of any host device or host device file system process. If at 604, it is determined that there is no pending LSD initiated event, then the process 600 ends, otherwise a 606 a determination is made whether or not the host device in continuously polling the local storage device. If the host device is not polling the local storage device, then the local storage device generates a LSD logical request at 608 that includes information related to the pending LSD initiated event and at 610 the local storage device throws up an interrupt flag associated with the LSD logical request. At 612, the host device responds to the interrupt flag.

Returning to 606, if the host device is continuously polling the local storage device, then at 614, the local storage device responds to the host device polling with an LSD polling response that includes information related to the pending LSD initiated event. At 616, the host device responds to the LSD polling response.

Figure 7:
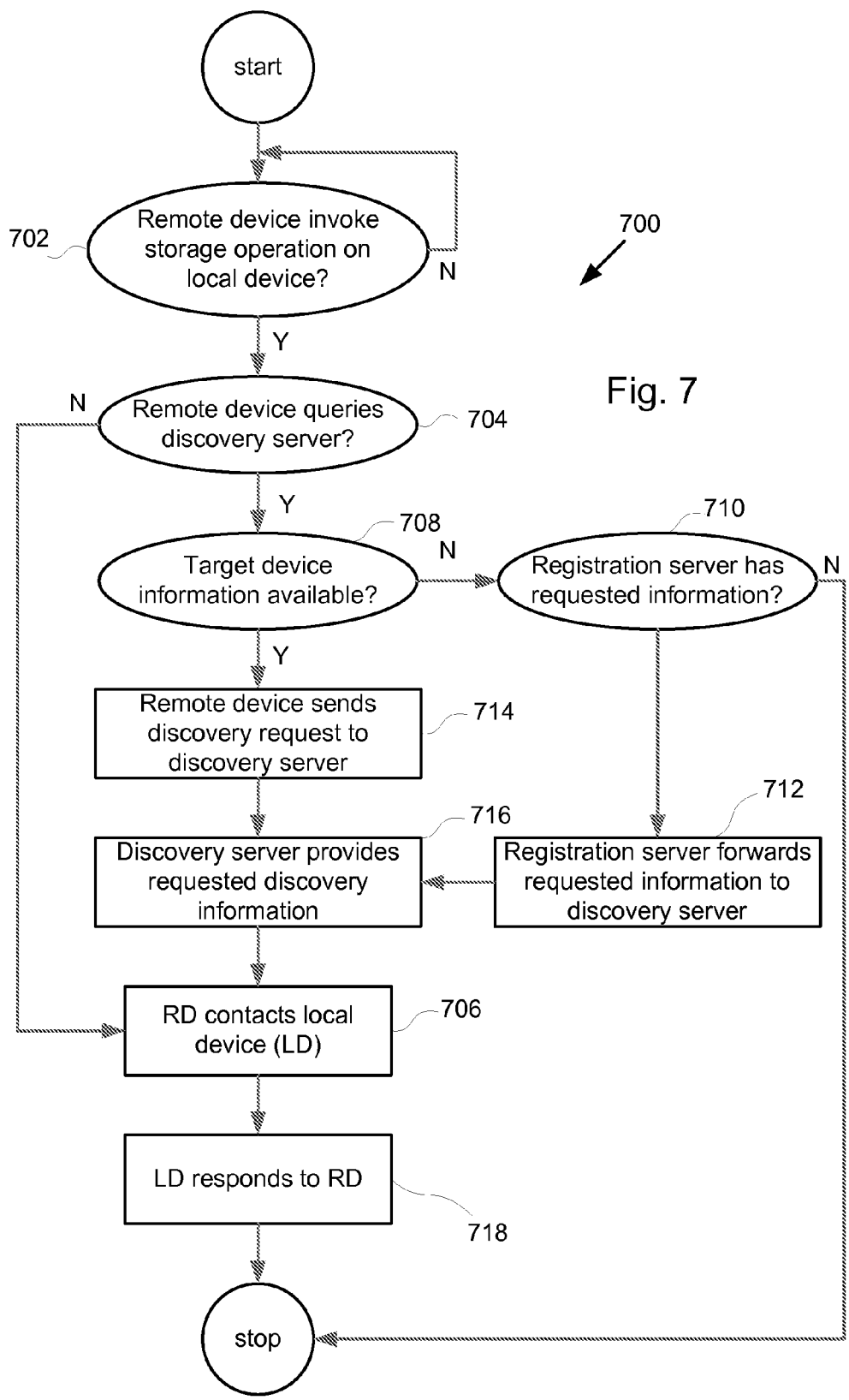
FIG. 7 shows a flowchart detailing a process in accordance with an embodiment of the invention.

FIG. 7 illustrates a process 700 in accordance with an embodiment of the invention. Process 700 begins at 702 by determining if a remote device wants to invoke an operation on a local target device. If affirmative, then at 704 a determination is made if the remote device sends a query to the discovery server in order to obtain target device information. If the remote device has determined that it does not need to query the discovery server, than at 706 the remote device contacts the local device. On the other hand, if the remote device has determined that discovery information for the target device is needed, than at 708 a determination is made whether or not the discovery server has the target device discovery information. If it is determined that the discovery server does not have the requested target device discovery information, then at 710 a determination is made whether or not a registration server has the requested target device information. If it is determined that the registration server does not have the requested target device information, then process 700 ends. Otherwise, the registration server forwards the requested target device discovery information to the discovery server at 712. Returning back to 708, if the discovery server has determined that it has the requested target device discovery information, then at 714, the remote device sends a discovery information request to the discovery server and at 716 the discovery server provides the requested target device discovery information. At 706, the remote device contacts the target device and at in any case, at 718 the target device responds to the remote device.

Figure 8:
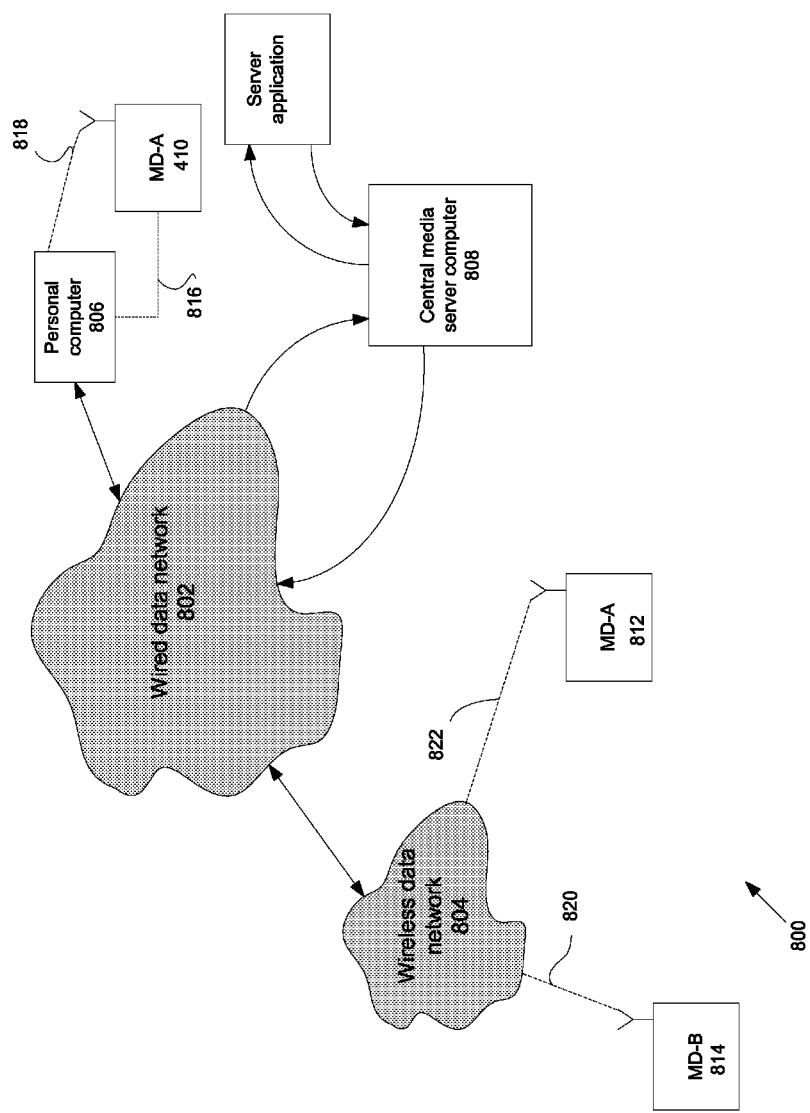
FIG. 8 shows a representative media network in accordance with an embodiment of the invention.

FIG. 8 provides a context of the invention where a media network 800 as a specific configuration of network 226 includes a number of media devices such as media players. In this example, computing system 200 can be a media player 100 arranged to store a number of digital media items (such as video, audio possibly as MP3 files, etc.). Network 800 can include distributed communications 802 configured as either or both a wired network 804 and a wireless network 806. In the described embodiment, wired data network 802 pertains to some portion of the World Wide Web. Personal computer 806 can couple to wired network 802 (which in this case is connected to computing system 100 by way of a USB cable at second interface). Wireless data network 804 can also couple to wired data network 802. Wireless data network 804 can include one or more wireless data networks, such as cellular networks, WiFi networks, WiMAX networks, etc.

Media network 800 includes central media server 808 that stores or has access to numerous media items. In addition, network 800 supports one or more additional computing systems 810 configured as network devices that can take the form of portable media devices such as portable media player 200, 810, 812 and 814 some of which can be configured as having only legacy mass storage while others can be configured as computing system 200 shown in FIG. 2. Any of the portable media devices 200, 810, 812 and 814 can communicate with personal computer 806 over wired link 816 or wireless link 818. As an example, wired link 816 can correspond to a cable (e.g., USB cable) that, if available, can interconnect portable media device 810 to personal computer 806. Wireless link 818 can be provided by a wireless capability, such as Bluetooth, infrared, etc. Typically, the portable media device 810 would be capable of communicating with personal computer 806 using either wired link 816, wireless link 816, or both.

Portable media device 814 can couple to the wireless data network 804 over a wireless link 820. Similarly, portable media device 812 can couple to wireless data network 804 over a wireless link 822. In this regard, portable media devices 814 and 812 can access central media server 808 via wireless data network 804. In addition, portable media devices 810, 812 and 814 can wirelessly access each other, thereby exchange media item data between portable media devices.

Computing system 200 can take the form of a media device that can pertain to portable media players such as MP3 players as well as wireless device such as mobile phones that can include LSD 204 and HD 202. These mobile devices can include a media management application on the host computer that operates on the mobile device. Given the portability of mobile devices, mobile devices are smaller and have less resources (e.g., storage capacity). Consequently, a media management application designed for use on a mobile device can offer less features and capabilities than would a counterpart media management application operating on a larger, more powerful computing device, e.g., a personal computer. Given that the mobile devices have wireless access to central media server 808, the mobile devices can interact with media server 808 to request and/or receive media item data (or other data). In this regard, a media management application operating on the mobile devices can communicate with the media server 808 to perform various tasks, including: navigating available media content at the server (such as navigation of a media store), receiving a periodic delivery of media content to media devices (such as a daily pushing of media item data from a server to a media device), etc.

Figure 9:
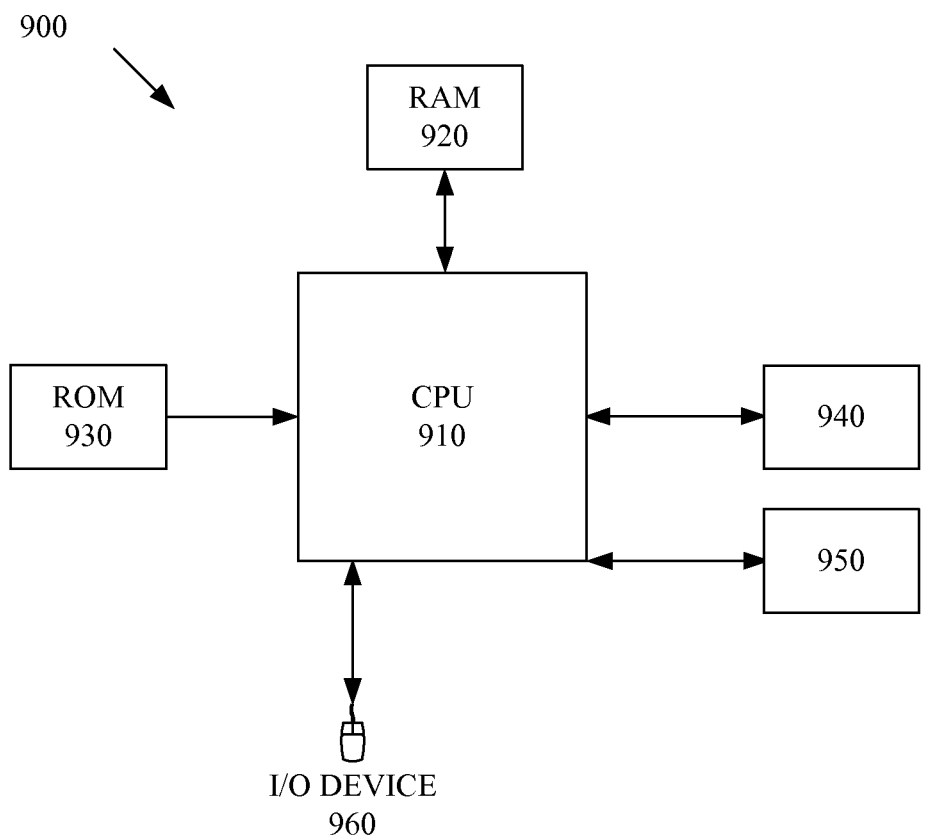
FIG. 9 shows a representative system illustrating additional components typically found in host device.

FIG. 9 shows a representative system 900 illustrating additional components typically found in host device 204. System 900 includes central processing unit (CPU) 910, random access memory (RAM) 920, read only memory (ROM) 930, and primary storage devices 940 and 950. As is well known in the art, ROM 930 acts to transfer data and instructions unidirectionally to the CPU 910, while RAM 920 is used typically to transfer data and instructions in a bi-directional manner. CPU 910 may generally include any number of processors. Both primary storage devices 940 and 950 may include any suitable computer-readable media. CPUs 910 are also coupled to one or more input/output devices 960 familiar to those of skill in the computer hardware and software arts.

In the described embodiment, mobile devices (e.g., portable media devices) can communicate with one another. This type of communication can be referred to as peer-to-peer interaction. In this regard, one mobile device can communicate (e.g., unicast) directly with another mobile device. In another example, one mobile device can communicate (e.g., broadcast, any cast or multicast) to a plurality of other mobile devices. In the peer-to-peer environment, one mobile device can communicate with one or more other electronic devices (whether mobile or stationary) in the immediate vicinity. Data sharing can be performed when such communication is available.

Data transfer could be between a mobile device and a computing device, such as a home computer or another mobile device. Typically, the mobile device and the computing device would be associated with a particular user. For example, when the mobile device is within range of a home computer (or a home network), data transfer can be performed between the mobile device and the home computer. Data transfer could also be between two or more mobile devices, or between two or more non-mobile devices. The data transfer can be automatic without any user action or can alternatively require manual approval by a user. The network devices can be associated with one another via an identification number or other suitable mechanism.

A mobile device or non-mobile device capable of receiving, transmitting and/or storing data may be referred to as a "data device." The manner by which the data arrives at the data device can depend upon implementation. For example, the data can be directly transferred to the data device, or the data can be indirectly transferred to the data device. For example, the data transfer can be between one data device to another data device. Alternatively, one data device can cause another data device to transfer desired data to a recipient data device.

The shared data can be transferred to a recipient device by file transfer or streaming. The data transferred can be received by one or more data devices. Examples of data devices include a media player, PDA, a speaker unit, a wireless transmitter/receiver unit, etc. Users of data devices can also create and distribute content through data sharing. The streaming can be limited so as to restrict the number of data devices simultaneously receiving the data. On the other hand, if the users of the data devices are subscribers to the streaming content (i.e., have a subscription), then the streaming can be unlimited as to subscribers. Storing some portion of the media item content associated with the media item metadata may also be done to facilitate the streaming of media item content. For example, a user could begin playing such a previously stored portion of the media item content before streaming of the remaining content even begins.

Data can be shared after being purchased. For example, a recipient could purchase data from a remote server. The remote server would then cause the purchased data to be delivered to the recipient's data device. The purchase can be performed in real-time or can be deferred until a later point in time. Thereafter, the purchased data can be shared from the recipient's data device to another data device.

For example, in the work environment or other network environment, as a user comes into an employer's office to work, the user's mobile device can transfer data to the user's work computer or to a network server for the office. The data transfer can be automatic without any user action or can alternatively require manual approval by a user. The user of the mobile device can also communicate with mobile devices of coworkers or other users of the network to exchange data.

Regardless of the particular environment, the data transfer can be wireless. The wireless data transfer can be facilitated by a wireless network. One mobile device could wirelessly transmit data in a unicast fashion from one mobile device to another mobile device or stationary computing device. Still further, one mobile device could wirelessly transmit data in a multicast or broadcast fashion to a plurality of other mobile devices. It should be noted that any home-server computer can reside on any of a number of other data storage devices in a network to which computing device 200 belongs.

The advantages of the invention are numerous. Different embodiments or implementations may yield one or more of the following advantages. One advantage of the invention is legacy devices can be added or removed without consideration of modifying system hardware. Another advantage of the invention is that it can be used with any host computer without modification therefore reducing the cost and increasing the applicability of the invention.

The many features and advantages of the invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A local storage device (LSD), comprising:
   a HD/LSD interface providing a communication path between a host device (HD) and the LSD, wherein the LSD does not utilize any interface to a device external to the HD other than that HD/LSD interface;
   a controller in communication with the HD/LSD interface, the controller configured to:
      generate a LSD logical request independent of the HD, wherein the LSD logical request is not created to serve a HD initiated process; and
      send the LSD logical request to the HD over the HD/LSD interface to prompt the HD to:
         utilize a network interface to provide a network link between the HD and a remote application associated with a device external to the HD and the LSD included in a network, or
         provide a local communication path between the LSD and a local application other than a LSD driver that is associated with a local device external to the LSD, wherein the local communication path is not the network link and wherein the local device is in local communication with the HD;
   wherein the local device is a second LSD managed by the host device;
   wherein the device external to the host device and the LSD is a network device (ND); and
   wherein when the network is an IP protocol based network, then the LSD and the second LSD are assigned an LSD IP address and a second LSD IP address, respectively, the host device is assigned a host device IP address, and the ND is assigned an ND IP address.

2. The LSD of claim 1, wherein the HD comprises a host device file system (HDFS) arranged to generate a block command; and
   wherein the LSD comprises at least one storage area managed at least by the HDFS, wherein the HDFS manages the at least one storage area by generating a block command that is passed to the at least one storage area by way of the HD/LSD interface.

3. The LSD of claim 2, wherein the HD comprises the LSD driver, and
   wherein the LSD driver is in communication with the HDFS and is configured to facilitate the passing of the block command from the HDFS to the at least one storage area by way of the HD/LSD interface.

4. The LSD of claim 3, wherein the LSD is configured to prompt the HD by:
   sending the LSD logical request to the HD in response to a poll from the HD, wherein the host device's polling is independent of any HDFS initiated process and the LSD driver; or
   associating the LSD logical request with a LSD interrupt signal, and raising the LSD interrupt to the attention of the host device when the HD is not polling the LSD.

5. The LSD of claim 1, wherein the controller is configured to detect a set of LSD parameters operation and, as a result, generates the LSD logical request as a detection logical request.

6. The LSD of claim 5, wherein to detect the set of parameters operation, the controller is further configured to:
compare a current state of the LSD to a set of rules governing operation of the LSD.

7. The LSD of claim 6, wherein the detected parameters are selected from a group consisting of: a data content back-up parameter, a data content parameter, a logical storage parameter, a physical storage parameter, a violation of rules parameter, and a host device IP address.

8. The LSD of claim 7, wherein the data content parameter is selected from a group consisting of: a file size, a file type, a file name, and a file keyword,
wherein the logical storage parameter includes a remaining capacity, and a LSD IP address, and
wherein the physical storage parameter is selected from a group consisting of: a wear level, a number of bad blocks, and a number of bit flips.

9. The LSD of claim 8, wherein the detection logical request prompts the HD to establish the network link between the LSD and the remote application, and
wherein the LSD and the remote application logically interact over the network link to perform a requested detection process without further intervention by the HD except to maintain the network link, or the detection logical request prompts the HD to establish the local communication path between the LSD and the local application,
wherein the LSD and the local application logically interact over the local communication path to perform the requested detection process without further intervention by the HD except to maintain the local communication path, and
wherein the requested detection process is selected from a group consisting of: a content backup process, a content sharing process, an event notification process, a request for a remote instruction process, a request for usage/access right process, a registration to a remote server process, and a request to a discovery server process.

10. The LSD of claim 9, wherein the controller is further configured to associate the detection logical request with the polling by the host device, thereby prompting the host device to establish the network link between the LSD and the remote application or to establish the local communication path between the LSD and the local application.

11. The LSD of claim 9, wherein the controller is configured to associate the LSD logical request with a LSD interrupt signal, and to raise the LSD interrupt to the attention of the host device, thereby prompting the host device to establish the network link between the LSD and the remote application or to establish the local communication path between the LSD and the local application.

12. The LSD of claim 1, wherein the network interface is included in the host device.

13. A local storage device (LSD), comprising:
a HD/LSD interface providing a communication path between the LSD and a host device (HD) comprising a host device file system, wherein the LSD does not utilize any interface to a device external to the HD other than the HD/LSD interface;
at least one storage area managed by the HD, wherein the HD is configured to manage the at least one storage area by sending a block command to the at least one storage area by way of the HD/LSD interface; and
a controller in communication with the HD/LSD interface and the at least one storage area, the controller configured to:
generate a LSD logical request that is not created to serve a HD initiated process;
prompt the HD to:
utilize a network interface to provide a network link between the HD and a remote application associated with a device external to the HD and the LSD included in a network of interconnected devices, or
provide a local communication path between the LSD and a local application other than a LSD driver that is associated with a local device external to the LSD, wherein the local communication path is not the network link and wherein the local device is in local communication with the host device;
execute a requested process with the LSD logical request;
associate the LSD logical request with a LSD interrupt; and
raise the LSD interrupt to the attention of the host device, thereby prompting the host device to execute the requested process;
wherein the local device is a second LSD managed by the host device;
wherein the device external to the host device and the LSD is a network device (ND); and
wherein when the network is an IP protocol based network, then the LSD and the second LSD are assigned an LSD IP address and a second LSD IP address, respectively, the host device is assigned a host device IP address, and the ND is assigned an ND IP address.

14. A local storage device (LSD), comprising:
a HD/LSD interface providing a communication path between the LSD and a host device (HD), wherein the LSD does not utilize any interface to a device external to the HD other than that interface provided by the HD;
at least one storage area managed at least by the HD, wherein the HD is configured to manage the at least one storage area by sending a block command to the at least one storage area by way of the HD/LSD interface; and
a controller in communication with the HD/LSD interface and the at least one storage area, the controller configured to:
send a LSD logical request that is not created to serve a HD initiated process to the HD in response to the HD polling the LSD, wherein the polling by the HD is independent of any HD initiated process and wherein the LSD logical request prompts the HD to:
utilize a network interface to provide a network link between the host device and a remote application associated with a device included network of interconnected devices external to the host device and the LSD, or
provide a local communication path between the LSD and a local application other than a LSD driver that is associated with a local device external to the LSD wherein the local communication path is not the network link, wherein the local device is in local communication with the host device;
wherein the local device is a second LSD managed by the host device;
wherein the device external to the host device and the LSD is a network device (ND); and
wherein when the network is an IP protocol based network, then the LSD and the second LSD are assigned an LSD IP address and a second LSD IP address, respectively, the host device is assigned a host device IP address, and the ND is assigned an ND IP address.

15. The LSD of claim 14 wherein the second LSD is managed by the HD.

* * * * *